United States Patent [19]

Moore et al.

[11] Patent Number: 5,317,730

[45] Date of Patent: May 31, 1994

[54] SYSTEM FOR MODIFYING PERSISTENT DATABASE BASED UPON SET OF DATA ELEMENTS FORMED AFTER SELECTIVE INSERTION OR DELETION

[75] Inventors: Richard E. Moore, Marietta; Mary K. Nix, Alpharetta; Floyd W. Shackelford, Buford, all of Ga.

[73] Assignee: International Business Machines Corporation, Armonk, N.Y.

[21] Appl. No.: 641,021

[22] Filed: Jan. 11, 1991

[51] Int. Cl.⁵ .................. G06F 15/403; G06F 15/415
[52] U.S. Cl. ...................... 395/600; 395/425; 364/282.1; 364/974.6; 364/DIG. 2
[58] Field of Search ................. 364/DIG. 1, DIG. 2, 364/600; 395/600, 325, 425

[56] References Cited

U.S. PATENT DOCUMENTS

| | | | |
|---|---|---|---|
| 4,868,744 | 9/1989 | Reinsch et al. | 395/575 |
| 4,945,474 | 7/1990 | Elliot et al. | 395/575 |
| 5,050,075 | 9/1991 | Herman et al. | 395/600 |

OTHER PUBLICATIONS

Korth & Silberschatz, *Database System Concepts*, McGraw-Hill (New York, 1986) pp. 45–105.

Banerjee et al. "Queries in Object-Oriented Databases", CH 2550-2188/0000/031.

Hardwick et al. "The Rose Data Manager: Using Object Technology to Support Interactive Engineering Applications" IEEE Trans. on Knowledge & Data Eng, vol. 1, No. 2, Jun. 1989.

*Primary Examiner*—Thomas C. Lee
*Assistant Examiner*—Paul R. Lintz
*Attorney, Agent, or Firm*—Sterne, Kessler, Goldstein & Fox

[57] ABSTRACT

A system and method for dynamic processing of unbounded data streams. The system is adapted to operate on a data processing system including a display panel and a database stored on a non-volatile storage device. An input stream of data elements is received by the system from the database. The input stream of data elements is designated as a source data stream. An insert list of data elements is provided to maintain a first set of data elements arranged in sequence according to a corresponding sequence value; the first set of data elements is not contained in the source data stream. A delete list of data elements is provided to maintain a second set of data elements presently in the source data stream, and arranged in sequence according to a corresponding sequence value. A flagged list of data elements selected for further processing by a user, contains a third list of data elements arranged in sequence according to a corresponding sequence. In order to identify a data element to be returned to the display panel in response to a request for a current element in an apparent list of data elements, the system filters the source data stream through the insert list of data elements to obtain a candidate data element for the next element in the apparent list. The system then filters candidate data element through the delete list of data elements to verify that the candidate element has not been deleted. The system may optionally check the candidate data element through the flagged list of data elements to determine if the candidate element has been flagged. Finally, the system sets the candidate data element as the current data element in the apparent list and returns the current data element to the display panel.

8 Claims, 14 Drawing Sheets

THE VISUAL PANEL:

| NAME | EXTENSION |
|---|---|
| _FLOYD | 6207 |
| _MARY KATHRYN | 6214 |

Fig. 10A

THE FILTER USED TO DISPLAY IT:

| FLOYD | 6207 |
|---|---|
| ► MARY KATHRYN | 6214 |

Fig. 10B

THE VISUAL PANEL:

| NAME | EXTENSION |
|---|---|
| _FLOYD | 6207 |
| _MARY KATHRYN | 6214 |
| _RITCHIE | 5651 |

Fig. 11A

THE NEW STATE OF THE FILTER:

▶ | RITCHIE | 5651 |

| FLOYD | 6207 |

▶ | MARY KATHRYN | 6214 |

Fig. 11B

THE VISUAL PANEL:

| NAME | EXTENSION |
|---|---|
| _FLOYD | 6207 |
| _RITCHIE | 5651 |

Fig. 12A

THE NEW STATE OF THE FILTER:

▶ | RITCHIE | 5651 |

| FLOYD | 6207 |
▶ | MARY KATHRYN | 6214 |

▶ | MARY KATHRYN | 6214 |

Fig. 12B

THE VISUAL PANEL:

| NAME | EXTENSION |
|------|-----------|
| FLOYD | 6207 |
| RITCHIE | 5651 |

Fig. 13A

THE NEW STATE OF THE FILTER:

▶ | RITCHIE | 5651 |

| FLOYD | 6207 |

▶ | MARY KATHRYN | 6214 |

▶ | MARY KATHRYN | 6214 |

▶ | RITCHIE | 5651 |

Fig. 13B

THE VISUAL PANEL:

NAME          EXTENSION

/RITCHIE      5651

Fig. 14A

THE NEW STATE OF THE FILTER:

▶ | RITCHIE | 5651 |

| FLOYD | 6207 |
▶ | MARY KATHRYN | 6214 |

| FLOYD | 6207 |
▶ | MARY KATHRYN | 6214 |

▶ | RITCHIE | 5651 |

Fig. 14B

SYSTEM FOR MODIFYING PERSISTENT DATABASE BASED UPON SET OF DATA ELEMENTS FORMED AFTER SELECTIVE INSERTION OR DELETION

BACKGROUND OF THE INVENTION

1. Field of the Invention

The field of the invention relates generally to a cut and paste filter for unbounded, dynamic, non-modifiable data streams. More particularly, the invention relates to a system and method for permitting users to interact with listed data elements without immediately saving changes to the database.

2. Related Art

There are several conventional data processing systems which immediately commit changes to the database.

One example is U.S. Pat. No. 4,717,911 to Matsuura. This patent teaches a system for editing a document. Lines of the document are chained together in memory by pointers. Additional pointers are added to the chained document during editing. The added pointers permit the original text to be reconstructed if the user later determines that the editing was erroneous.

In addition, U.S. Pat. No. 4,498,145 to Baker et al. teaches a system and method for updating row data in a database using a soft log for storing modified data until changes are complete. The soft log is used to maintain the state of the system perceived by the user in the event that an update fails.

Several commercially available word processors such as WordPerfect ®, support retrieval of recently deleted data by simple buffering of the deleted text.

The present invention overcomes various deficiencies of conventional list processing systems.

SUMMARY OF THE INVENTION

The present invention is directed to a system and method for dynamic processing of unbounded, dynamic, non-modifiable data streams. The system is adapted to operate on a data processing system including a display panel and a database stored on a non-volatile storage device. An input stream of data elements is received by the system from the database. The input stream of data elements is designated as a source data stream. The source data stream may be unbounded, dynamic, and directly non-modifiable by the cut and paste filter.

An insert list of data elements is provided to maintain a first set of data elements which may not be contained in the source data stream. However, the source data stream may be later updated to include the data elements of the insert list, subsequent to a user commit, for example. The first set of data elements is arranged in sequence according to a corresponding sequence value associated with each data element.

A delete list of data elements is provided to maintain a second set of data elements which may be in the source data stream. The second set of data elements, which may be in the unbounded, dynamic, non-modifiable data stream, may be arranged in sequence according to a corresponding sequence value associated with each data element.

A flagged list of data elements, selected for further processing by a user, contains a third list of data elements arranged in sequence according to a corresponding sequence value associated with each data element.

The system comprises four pointers which are initialized at the beginning of a reading process. A current source data stream pointer, a current insert list pointer, a current delete list pointer, and a current flagged list pointer refer to a first element in the source data stream, the insert list, the delete list, and the flagged list, respectively.

The system identifies a data element to be returned to the display panel in response to a request for a current element in an apparent list of data elements. To accomplish this, the system filters the source data stream through the insert list of data elements to obtain a candidate data element for the next element in the apparent list. The system then filters the candidate data element through the delete list of data elements to verify that the candidate element has not been previously deleted by this user. The system may optionally check the candidate data element through the flagged list of data elements to determine if the candidate element has been flagged. Finally, the system sets the candidate data element as the current data element in the apparent list and returns the current data element to the display panel.

FEATURES AND ADVANTAGES OF THE PRESENT INVENTION

The cut and paste filter of the present invention provides the following features and advantages:

Accepts input from unbounded, dynamic, non-modifiable source lists of elementary objects (called elements).

Maintains a list of inserted elements which may have not yet been saved to the database (and thus may not be reflected in the source data stream).

Maintains a list of deleted elements that may have not yet been deleted from the database (and thus not reflected in the source data stream).

A means to identify each element's relative position within the list, based upon some ordering criteria which may have been specified by the user.

A means to compare ordinal values of two elements; that is, a means to determine if one element should appear before, in the same position as, or after another element, based upon the elements' relative positioning values.

BRIEF DESCRIPTION OF THE DRAWINGS

The invention will be better understood if reference is made to the accompanying drawings in which:

FIGS. 10A and 10B show initial display of the list panel and the filter used to display the list panel, respectively, in connection with the scenario shown in FIG. 9.

FIGS. 11A and 11B show the list panel and the new state of the filter, respectively, after a user adds an element to the scenario list in connection with the present invention.

FIGS. 12A and 12B show the list panel and the new state of the filter, respectively, after a user deletes the second element of the scenario list in connection with the present invention.

FIGS. 13A and 13B show the list panel and the new state of the filter, respectively, after a user selects the second element of the scenario list in connection with the present invention.

FIGS. 14A and 14B show the list panel and the new state of the filter, respectively, after a user deletes the first element of the scenario list in connection with the present invention.

DETAILED DESCRIPTION OF THE PREFERRED EMBODIMENTS

The following brief description of object-oriented computing system concepts is pertinent to the present invention and will provide the reader with a perspective on the present invention. However, the present invention is not limited to object-oriented programming systems, but may be used in connection with any system requiring lists of data to be viewed and changed by users.

A more detailed description of the concepts discussed in this section is found in a number of references, including *Object-Oriented Systems Analysis* by Sally Shlaer and Stephen J. Mellor (Yourdon Press Computing Series, 1988), *Object Oriented Design With Applications* by Grady Booch (The Benjamin/Cummings Publishing Company, 1990) and *Object Oriented Software Construction* by Bertrand Meyer, (Prentice Hall, 1988). An overview of data streams in database environments may be found in *An Introduction to Database Systems* by C.J. Date (Addison-Wesley Publishing Company, Inc., 1990).

In object-oriented programming systems, "messages" are sent to "objects". There are two parts to a message. The parts are: (1) Object (2) Action. The object of the message simply identifies that piece of data which comprises a specific object, called an "instance". The action specifies what to do with that data.

In conventional programming, emphasis is put on methods to be conducted on data sets. In object-oriented systems one is concerned with real world objects. These real world objects have attributes and actions to be performed on the attributes. An object is a data structure containing information about something of interest to the system and its users. Objects having similar characteristics and common behavior are instance objects of a class. In summary, instance objects contain information about things in the system and class objects contain information about instance objects. Class objects contain information that is global to all instances of a single class.

The Cut & Paste Filter (hereinafter called the "C&PF") permits users to work with unbounded lists of objects. Some changes made to the objects in the list may be immediately committed to the database while others can remain in memory until they are explicitly saved by the user. Explicit user initiated saves to the database are called commits.

Changes committed to the database will be reflected in the unbounded, dynamic, non-modifiable data stream. However, these committed changes need not be reflected immediately, as will be discussed in further detail below. Uncommitted changes, that is, changes still in memory and not written to the database, need to be applied to the list as it is displayed to the user.

Figure 1:
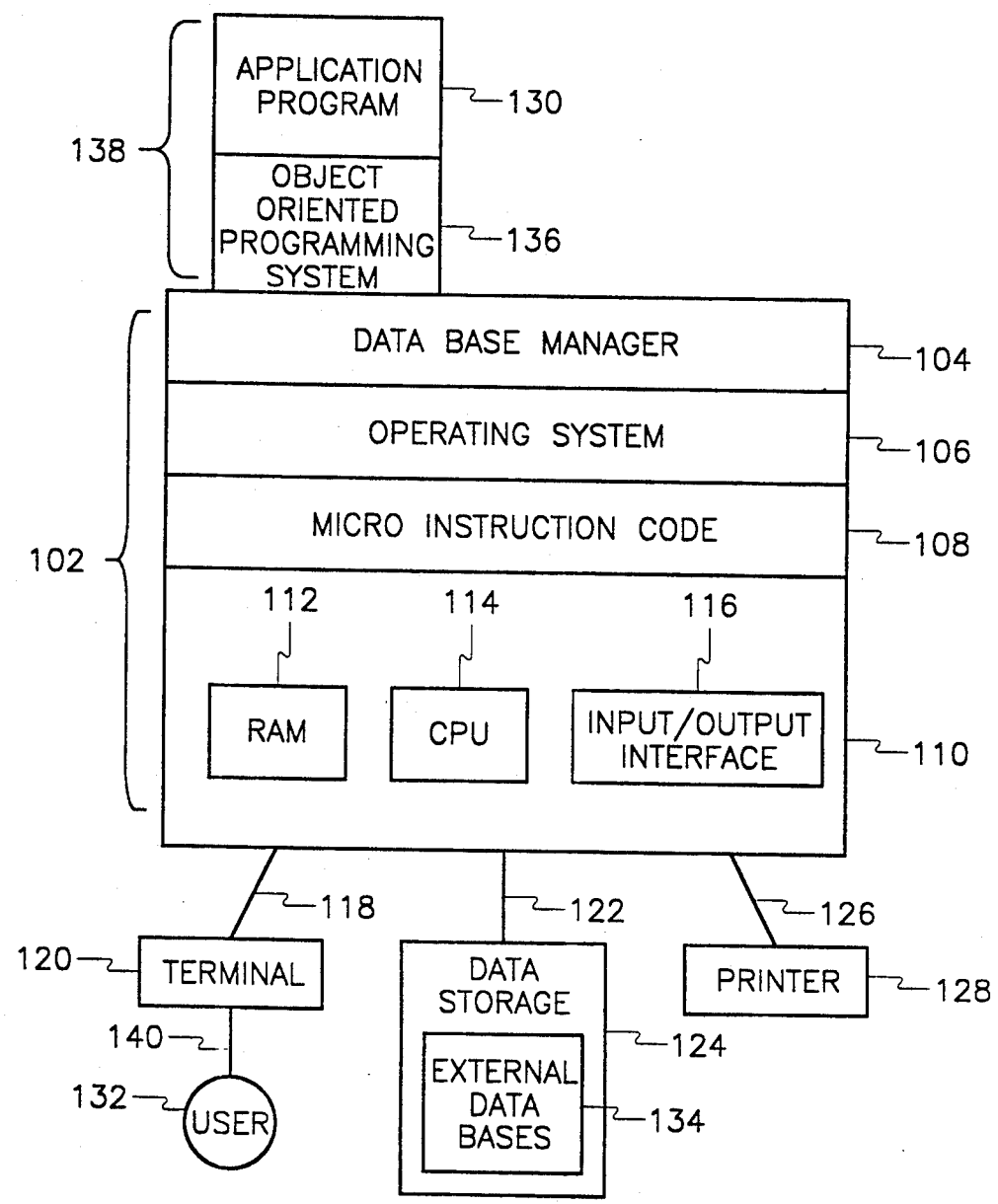
FIG. 1 shows an object-oriented programming system which can be used to implement the present invention.

An example of hardware implementation of an object-oriented system is shown in FIG. 1. A computer program 138 operates on a computer platform 102. The computer program 138 includes an application program 130 and an object-oriented programming system 136.

The computer platform 102 includes hardware units 110, including a central processing unit (CPU) 114, a random access memory (RAM) 112, and an input/output interface 116. The RAM 112 is also called a main memory.

The computer platform 102 also includes microinstruction code 108, an operating system 106, and a database manager 104. Various peripheral components may be connected to the computer platform 102, such as a terminal 120, a data storage device 124, and a printing device 128. The data storage device 124 is also called a secondary storage and may include hard disks and tape drives. The data storage device 124 represents nonvolatile storage. External databases 134 are stored on the secondary storage 124. In object-oriented systems the operating system uses virtual memory and manages all paging.

Users 132 interact with the computer platform 102 and the computer program 138 via terminal 120.

In a preferred embodiment of the present C&PF invention, the computer platform 102 includes a computer having an IBM System 370 architecture. The operating system 106 which runs thereon is an IBM Multiple Virtual Storage (MVS). The database manager 104 is an IBM DB2, which is a relational database manager. Also, the computer program 138 is preferably written in Intermediate C, which is an object oriented dialect of the C computer programming language. Intermediate C is similar to the C++ computer programming language.

Figure 2:
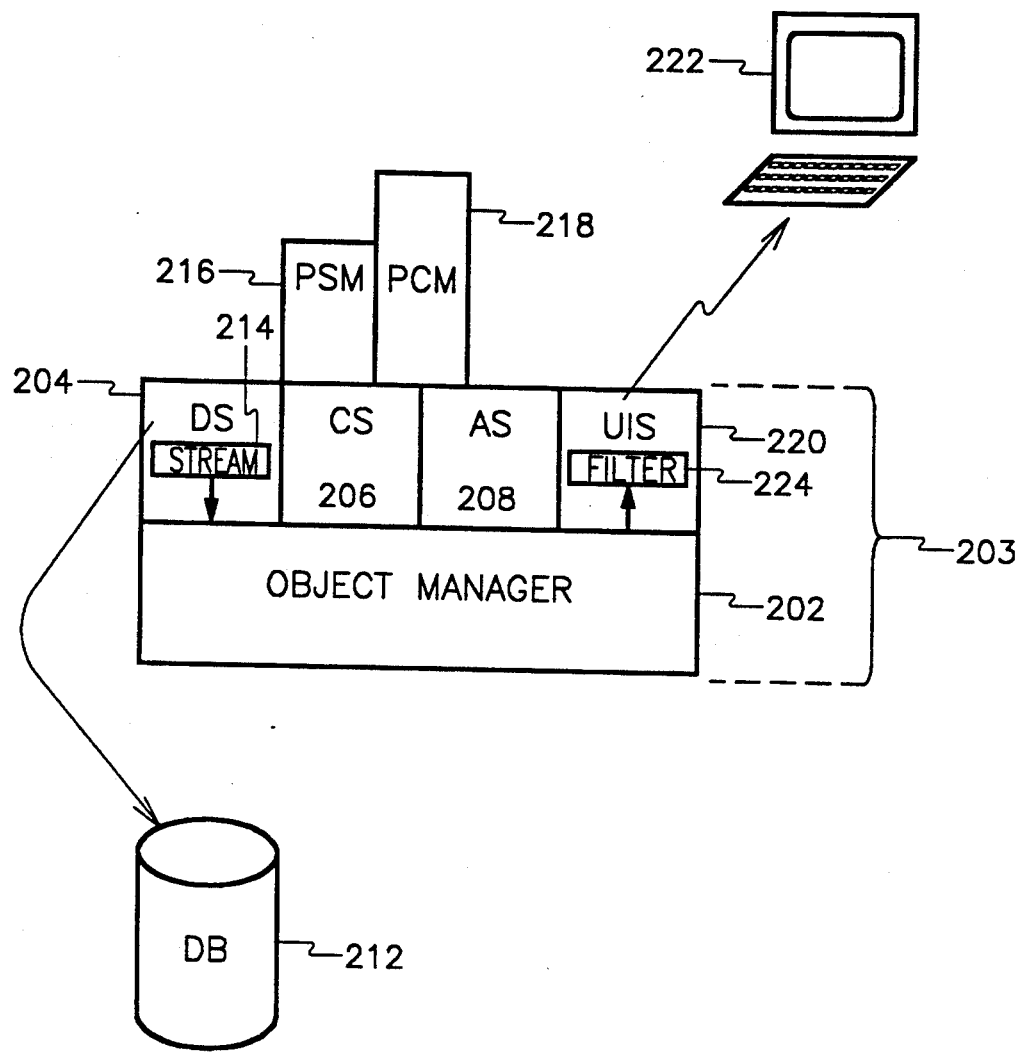
FIG. 2 shows a system environment for the cut and paste filter in connection with the present invention.

A preferred system environment for the C&PF is shown at FIG. 2. The object-oriented programming system 138 of FIG. 1 comprises an Object Manager (OM) 202, and four servers 204, 206, 208 and 220. These elements form the base of the object-oriented programming system, shown at 203. The base is a product available from IBM, titled Application Services Manager (program no. 5685-147), which provides common services that are required by the ProductManager application programs.

The purpose of the OM is multi-faceted. Its primary responsibility is to provide messaging support to facilitate the object-oriented programming paradigm of Product Manager: Engineering Management Edition (PM:EME). The OM transparently provides data access indirection, memory management, a unit of work environment, and automatic materialization and dematerialization of persistent objects from the data base.

The architecture used to implement PM:EME is an object-oriented system. PM:EME must be able to dynamically insert, delete, and flag elements in a source list based on user specified changes. The C&PF of the present invention has been developed to accept a source list from DB 212 and dynamically apply changes as the data elements are displayed to the user. This resultant list is called the "Apparent List".

The Data Server (DS) 204 functions to communicate between the Object Manager 202 and the Database (DB) 212. Data stream 214 represents a list of objects retrieved from the Database 212. The list of objects are also referred to as elements.

Communications Server (CS) 206 functions to carry out communications with application programs operating on the object-oriented system. Product Structure Manager (PSM) 216 and Product Change Manager (PCM) 218 are examples of such programs. PSM is an IBM product (program no. 5685-145) designed to maintain engineering and manufacturing product definition data that describes items used in the design, planning, procurement, production, distribution and maintenance of products. PCM is another IBM product (program no. 5685-144), which provides the ability to create and control the release and change of products.

User Interface Servicer (UIS) 220 controls the user interface 222, for example. User interface 222 may be a conventional terminal. The UIS formats the listed data elements into displayable form, in a fashion known to those of ordinary skill in the art. In connection with the present invention, the terminal permits user(s) to manipulate a list of data elements by entering instructions and data on a key pad and dynamically viewing the list of elements on a CRT. Filter 224 represents the cut and paste filter of the present invention, which is described in detail below in connection with FIG. 5. The OM provides the data stream 214 to the filter 224 for displaying on user interface 222.

The function of the C&PF is to display a list of "dirty" data lines on screen, thereby permitting user interaction with the list without actually committing these interactions to the database. The C&PF supports a plurality of users to be interacting with the same data stream. However, the data stream will appear different to each user as a result of the individual user's interactions.

The user is allowed to insert, delete or cut and paste lines in the list without saving the changes immediately. The changes must, however, be displayed to the user. Time delays may thereby be created in the system.

A first time delay occurs between the time a user initiates a command and the time the user commits the change to the database. A second time delay can occur between the time the changes are committed, and the time the changes are reflected in the data stream (e.g., the time required to update the source list, and then display the changes to the user).

It is possible that the second time delay is undefined. For example, the data stream may be discarded by the user before the user's former changes are reflected. In a further example, the user may be reading unidirectionally on the data stream and may not return to the changes; therefore the data stream may be discarded from the filter. The C&PF of the present invention compensates for both of these time delays. In the latter example, the C&PF would permit the user to scroll up to simulate a bidirectional cursor.

The data's "dirtiness", caused by the time delays discussed above, is therefore automatically compensated for by the filter. Changes may be grouped and held to optimize resource usage.

Also, the user may select one or more lines and scroll up and down before ever performing an action on the selected lines. The C&PF tracks these changes to the list, applies the changes as required, and stops tracking modifications when the source data list begins to exhibit the changes being tracked.

The C&PF comprises two main objects to implement the above functions. The Data Stream Element (DSE) and the Data Stream Filter (DSF) objects are managed by the C&PF to display the Apparent List to the user.

Figure 3:
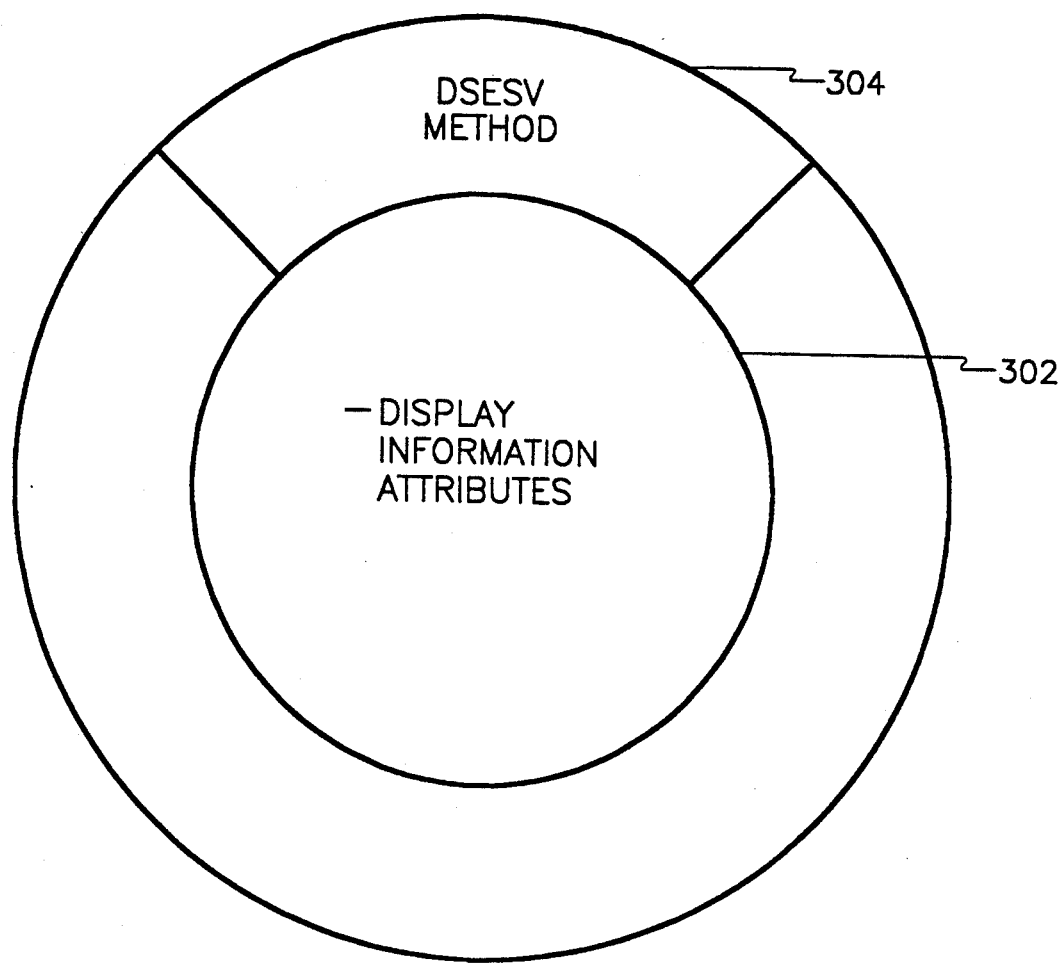
FIG. 3 shows a graphical representation of a data stream element object in connection with the present invention.

In an object-oriented environment, a Data Stream Element (DSE) is an object which contains all the display information pertinent to a particular, discrete source data row. A DSE is shown in FIG. 3. The display information attributes 302 are shown in the middle of the object. In addition to holding the display line, the DSE contains a method 304 which returns the object's sequencing value.

The DSE Sequencing Value (DSESV) is a feature (method) of the DSE which may return a sequencing value string, for example, for use in ordering this DSE in relation to any other arbitrary DSE. The sequencing value may be constructed by any number of instance attributes. The sequence value may be represented by a generic pointer to a buffer, for example. The string may be an arbitrary-length array of bytes of known size. Thus, the DSESV could be an integer, for example, stored into a string buffer. The DSESV may take on any format, as will become apparent to those working in the field.

Suppose, by way of example, that we have DSEs which are personnel objects. Additionally, suppose we wish to order the data by name. When one DSE is asked for its sequencing value (i.e., its DSESV), it may return the string "TIME, FATHER L.". Another DSE may return "NATURE, MOTHER T.". When an ordered list is created by the Data Stream Filter for these two DSEs, "NATURE, MOTHER T." will appear in the list before "TIME, FATHER L.".

Figure 4:
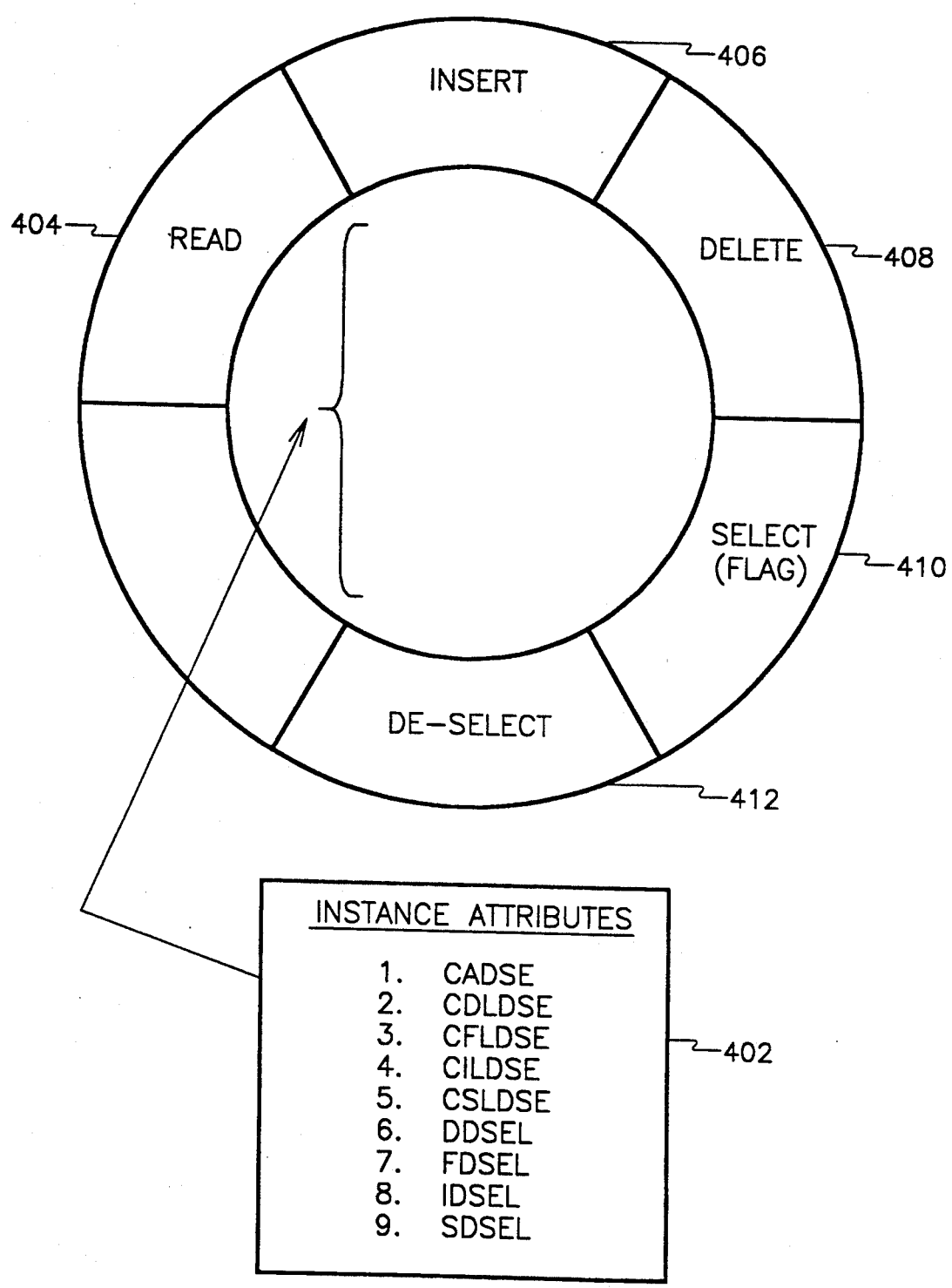
FIG. 4 a graphical representation of a data stream filter object in connection with the present invention.

The Data Stream Filter (DSF) object appears to the user as a seamless linked-list of Data Stream Elements (DSEs), that is, the Apparent List. In an object-oriented environment, a DSF may be structured as shown in FIG. 4. To keep track of all the data lists, the DSF utilizes the following instance attributes 402:

1. Current Apparent DSE (CADSE)
2. Current Deleted List DSE (CDLDSE)
3. Current Flagged List DSE (CFLDSE)
4. Current Inserted List DSE (CILDSE)
5. Current Source List DSE (CSLDSE)
6. Deleted DSE List (DDSEL)
7. Flagged DSE List (FDSEL)
8. Inserted DSE List (IDSEL)
9. Source DSE List (SDSEL)

Instance attributes 2–5 are pointers into the corresponding list instance attributes 6–9. Instance attribute 1 (CADSE) is also a pointer, which points to the current apparent Data Stream Element.

Methods provided by the DSF allow the user to navigate the Apparent List as well as notify it of read, insert, delete, select and de-select operations. These methods are numbered 404, 406, 408, 410 and 412 at FIG. 4, respectively.

These methods may be made available to the user(s) via an action bar on the display panel. Control keys, such as pageup, pagedown or cursor controls, permit the users to navigate, or read, through the Apparent List. Scrolling keys would allow the user to move from one list element to the next. The page keys allow the user to display sections of the Apparent List. Once the user flags an item(s) by entering an identifier, such as a forward slash, an action displayed on the action bar can be performed on the flagged item(s). Implementation of the action bar, scrolling and paging may be carried out by known techniques.

The Current Apparent Data Stream Element (CADSE) is an exported instance attribute which contains a reference to the DSE at the user's current position in the Apparent List. This value changes as the user navigates through the Apparent List.

The Current Deleted List Data Stream Element (CDLDSE) is an instance attribute which contains a reference to the DSE at the DSF's current position in the Deleted DSE List. This value changes as the user navigates through the Apparent List.

The Current Flagged List Data Stream Element (CFLDSE) is an exported instance attribute which contains a reference to the DSE at the DSF's current position in the Flagged DSE List. Flagged DSEs are those DSEs selected by the user for some future action or processing. This value changes as the user navigates through the Apparent List.

The Current Inserted List Data Stream Element (CILDSE) is an instance attribute which contains a reference to the DSE at the DSF's current position in the Inserted DSE List. This value changes as the user navigates through the Apparent List.

The Current Source List Data Stream Element (CSLDSE) is an instance attribute which contains a reference to the DSE at the DSF's current position in the Source DSE List. This value changes as the user navigates through the Apparent List.

The Deleted Data Stream Element List (DDSEL) is an instance attribute which contains a list of all the DSEs which have been deleted from the Apparent List but are still in the SDSEL. It is ordered by the DSESV.

The Flagged Data Stream Element List (FDSEL) is an exported instance attribute which contains a list of DSE's which have been "flagged" or "selected" by the user for some impending action. For instance, a user may select three items from a list of hundreds, then specify File.Delete on the action bar to delete these three items. This list changes as the user selects and de-selects items on the screen. The list is ordered by the DSESV.

The Inserted Data Stream Element List (IDSEL) is an instance attribute which contains a list of all the DSEs which have been inserted into the Apparent List but are not yet in the Source Data Stream Element List. The IDSEL is ordered by the DSESV.

The Source Data Stream Element List (SDSEL) is an instance attribute which contains the list of source DSEs from any data source. The SDSEL is ordered by the DSESV.

Usually, the SDSEL contains "dirty" information, that is, the information represents a snapshot of the data source list which becomes increasingly obsolete over time, because of user interaction. Eventually, a "refreshing" snapshot is taken of the data from the database and the list becomes "clean" again, although for only a very brief instant. However, neither the user nor the filter know when this happens. As changes are reflected in the source list, past changes can be deleted from the Insert and Delete lists.

The SDSEL can be a hard coded list, a SQL cursor, a Physical Sequential (e.g., MVS data set) file, or any other arbitrary list of DSEs.

Figure 5:
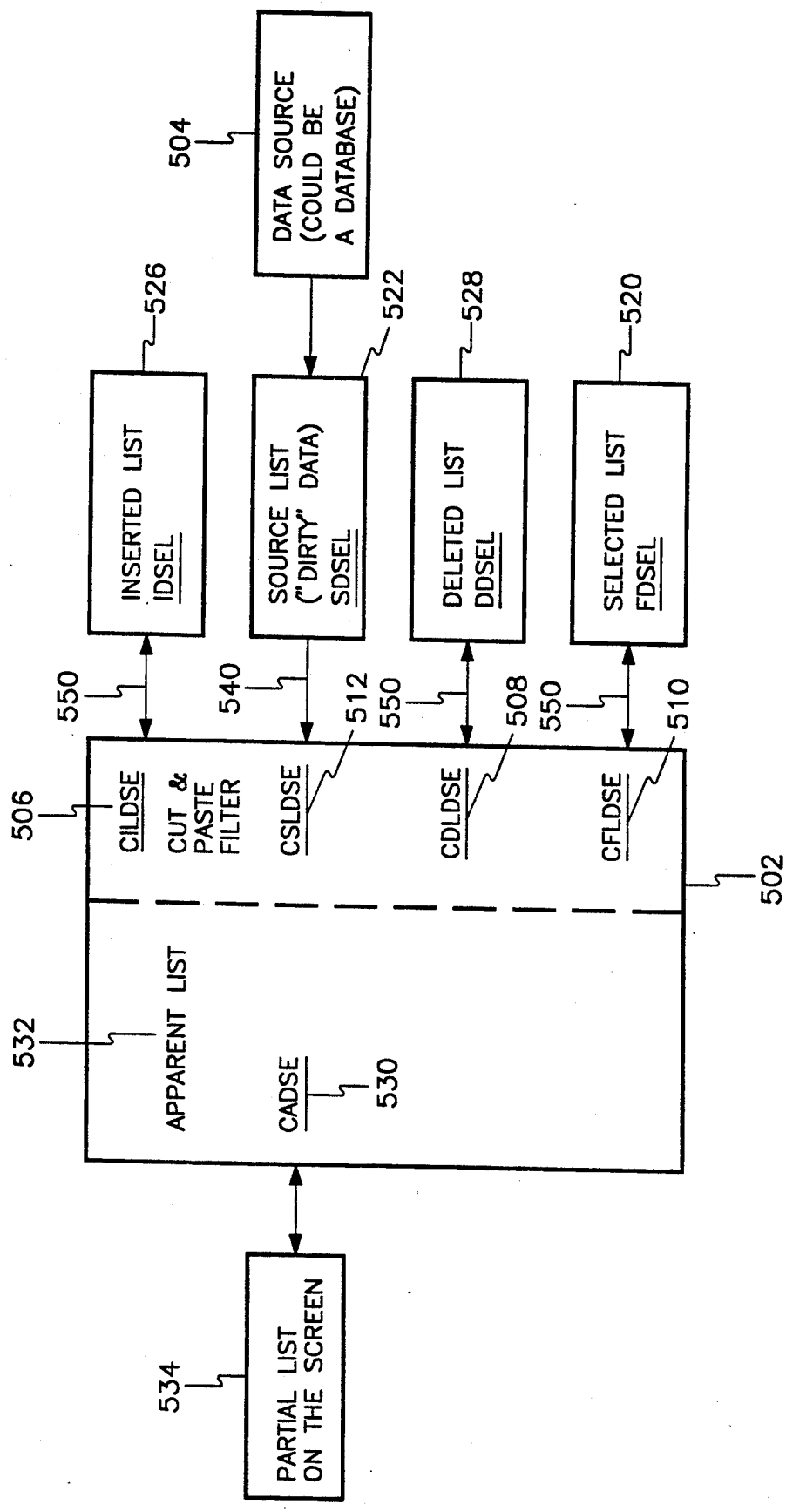
FIG. 5 shows a block diagram of the cut and paste filter in connection with the present invention.

A block diagram of the C&PF is shown in FIG. 5. The C&PF is shown at 502. A data source, possibly a persistent database, is labeled 504. Four pointers CILDSE 506, CDLDSE 508, CFLDSE 510 and CSLDSE 512 are depicted as part of the C&PF, and point to the IDSEL 526, DDSEL 528, FDSEL 520 and SDSEL 522, respectively. The CADSE pointer 530 points to the current element in the Apparent List 532. The section of the Apparent List 532 displayed to the user is the partial list 534. Arrow 540 represents one-way data flow from the database to the source list. The source is thus not directly modified by the C&PF. Changes entered by the user are shown in the Apparent List to the user; these changes may eventually be reflected in the source list as discussed below. Arrows 550 represent bidirectional data flow between the Insert, Delete and Flagged Lists and the C&PF.

The C&PF may comprise only a Deleted List and a source list. The need for sequencing values is thus eliminated. The sequencing values are not needed for this embodiment since a simple Boolean comparison can be made between each element of the Deleted List and the candidate to determine if the candidate has been deleted. Alternatively, the C&PF may only comprise a Delete List, a Flagged List and a source list. Again, DSESVs would not be necessary for this embodiment of the C&PF. In these alternate embodiments, the insertions, or pastes, to the list are directly saved (i.e., committed to the database).

Turning now to the operation of the C&PF shown in FIG. 5, the following describes how the DSF manipulates its different lists of DSEs to provide the Apparent List. When a user requests to insert a DSE, the DSF adds the DSE into the IDSEL in the appropriate location as determined by the DSESV. The CILDSE remains unchanged.

When a user requests to delete a DSE, the DSF adds the DSE into the DDSEL in the appropriate location as determined by the DSESV. The CDLDSE remains unchanged in response to a user deletion.

When a DSE has been flagged, or selected, by the user, then the DSE is added to the FDSEL in the appropriate location as determined by the DSESV. The CFLDSE remains unchanged in response to a user selection. A "de-selection" occurs when a user specifies that a DSE is to be un-flagged. The DSE is then removed from the FDSEL. If the CFLDSE is the DSE which has been un-flagged, then the CFLDSE advances to the next DSE in the FDSEL.

Figure 6:
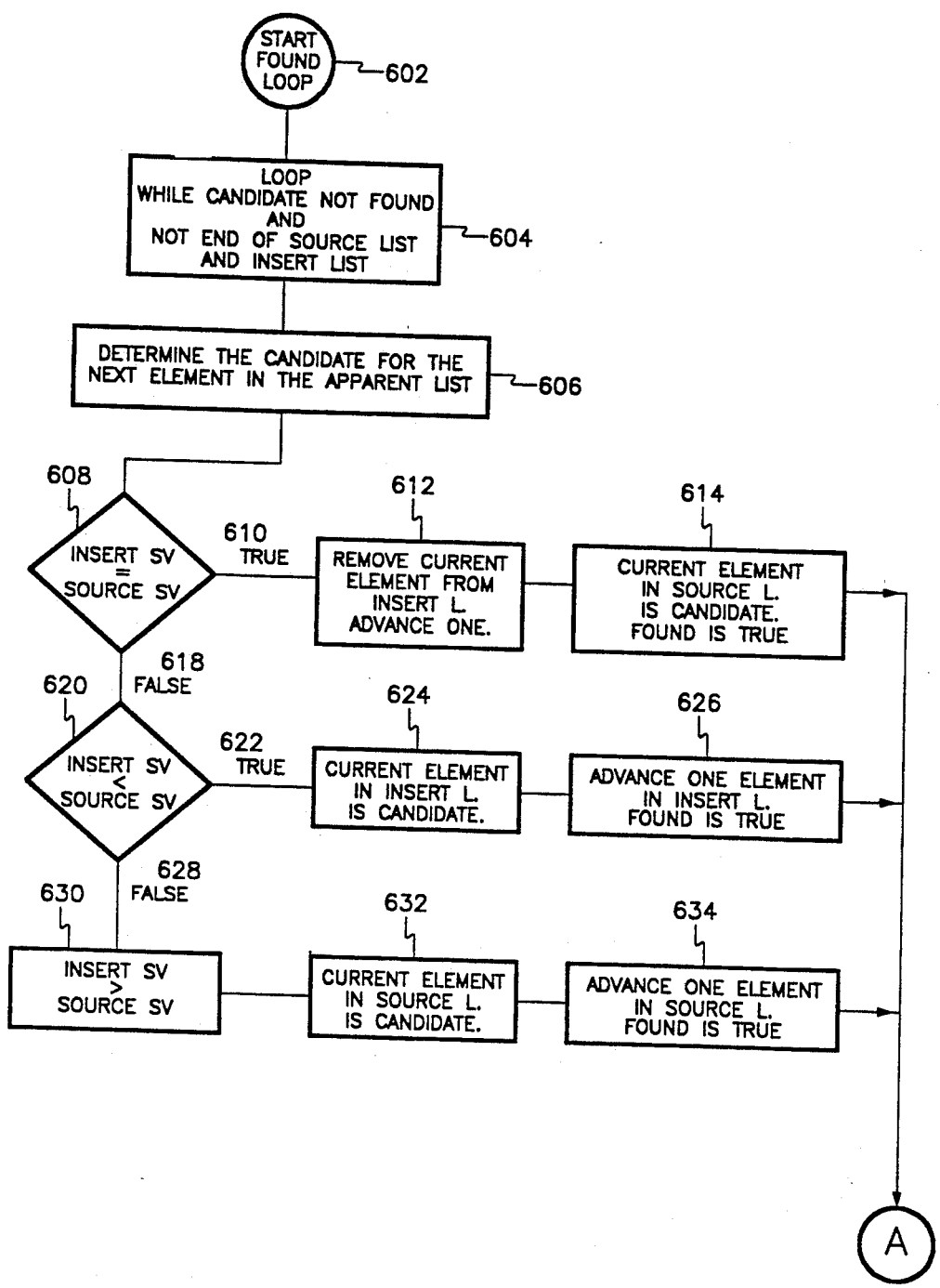
FIG. 6 is a flow chart showing insert filtering in connection with the present invention.
Figure 7:
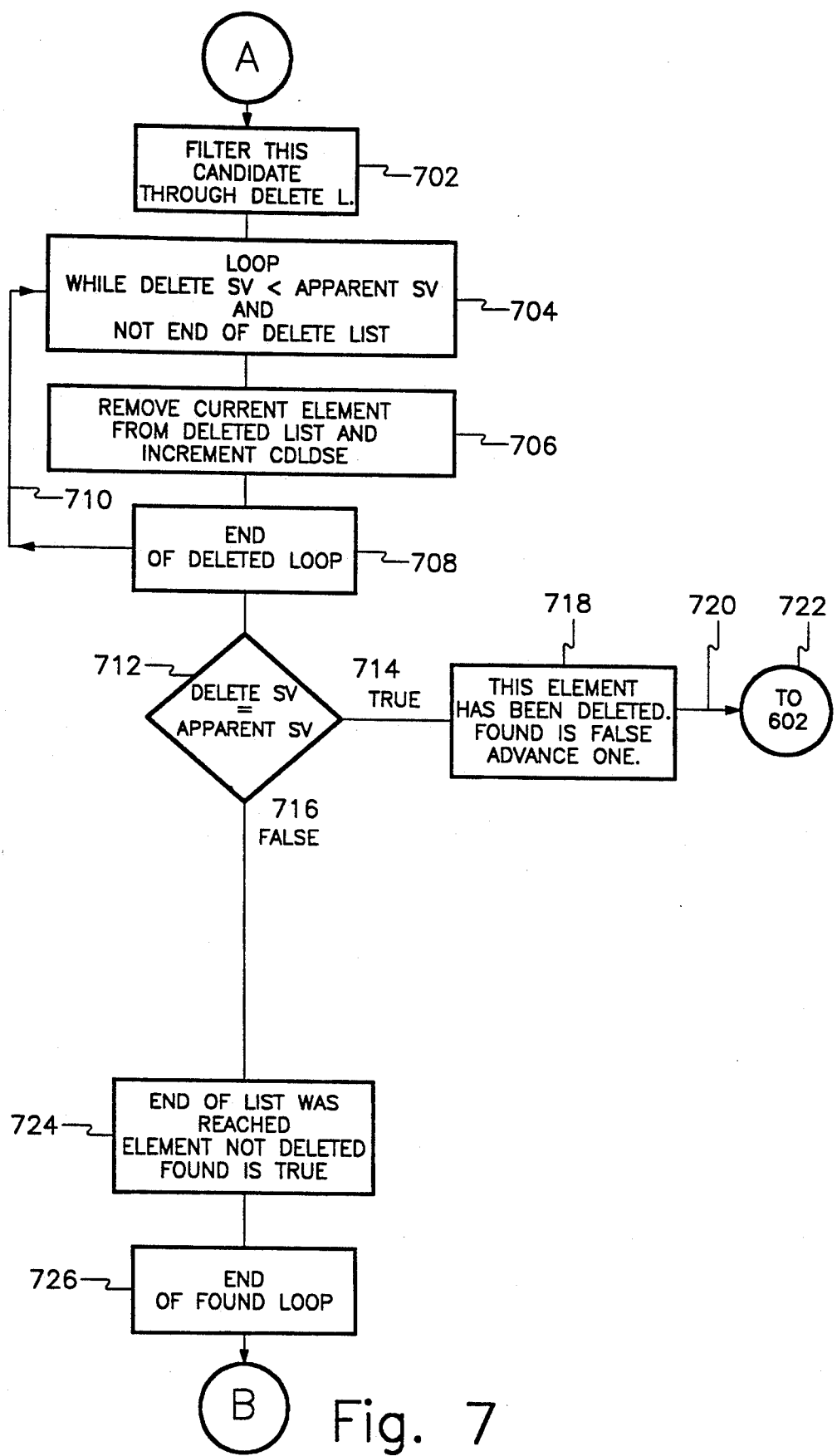
FIG. 7 is a flow chart showing delete filtering in connection with the present invention.
Figure 8:
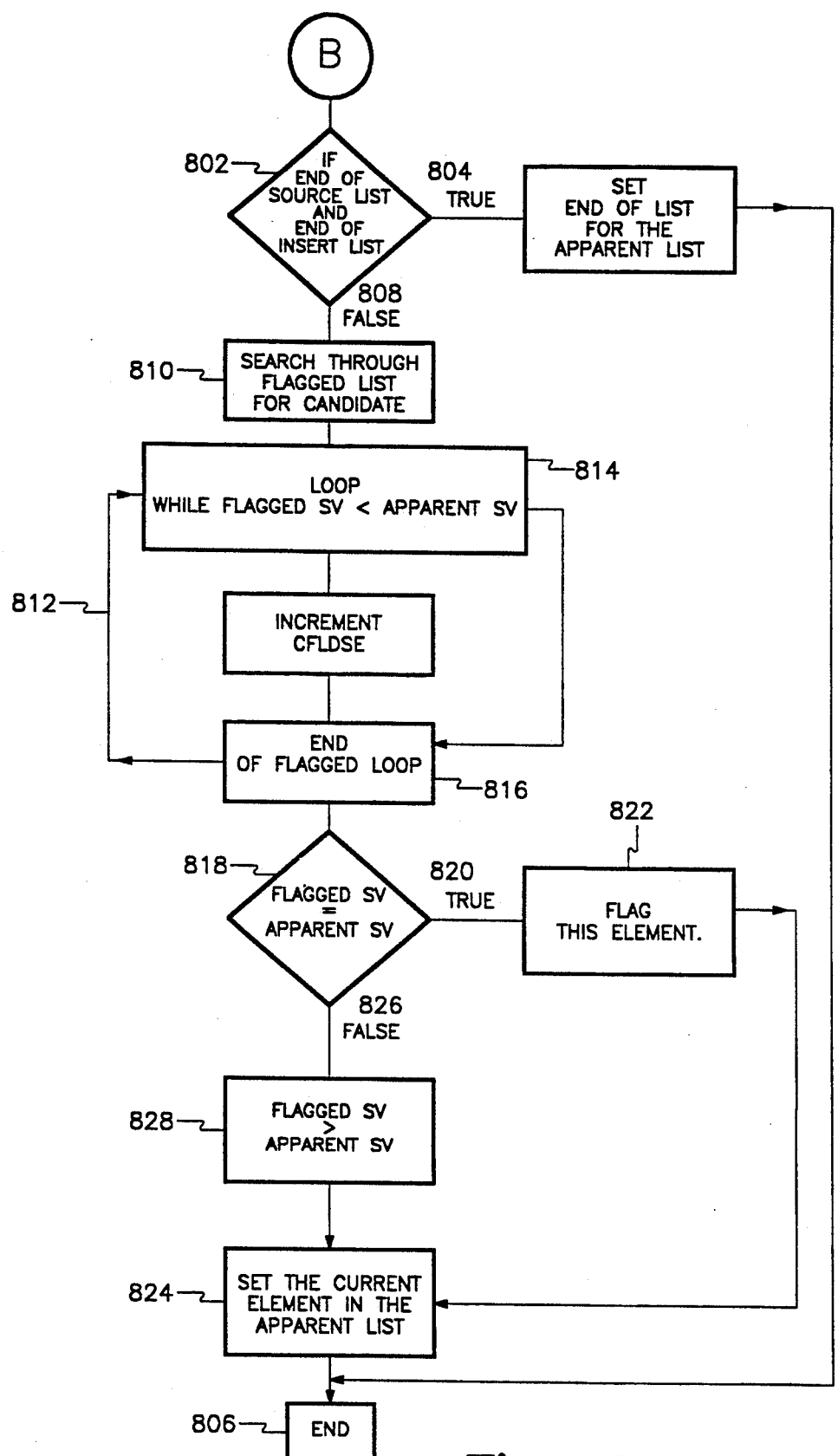
FIG. 8 is a flow chart showing selection verification in connection with the present invention.

The method by which the C&PF must determine which element is the next element in the Apparent List will be discussed with reference to FIGS. 6-8. The flow charts of FIGS. 6-8 represent the reading of the next DSE in the Apparent List.

The Source List is first filtered through the Insert List. This sequence is shown at FIG. 6. A main process loop titled "Found Loop" begins at 602. The loop continues while the candidate is not found and before the ends of the Source and the Insert Lists are reached, as shown at 604. This loop determines the candidate for the next element in the Apparent List as shown at 606. These two lists are effectively being merged as the user requests to move through the Apparent List (i.e., navigates).

Next, a determination is made to check whether the Insert List sequence value equals the Source List sequence value, as shown at conditional block 608. If the condition is true, as indicated at 610, the two sequence values are equal. This case indicates to the C&PF that the Source List has somehow been updated to include the element that was inserted (e.g., the data was saved to the data base). Therefore, the current element in the Insert List is removed, since its insertion has been reflected by the unbounded, dynamic, non-modifiable data stream, and the next element in the Insert List becomes the current Insert List element.

The current element in the Source List is the element used for the next step. The removal of the current element is shown at block 612 and the Current Inserted List Data Stream Element (CILDSE) is advanced. The location of the candidate has been determined due to the sequence values being equal, as shown at block 614. Since the candidate is found, flow continues to circle A, indicating that the candidate is to be filtered through the Delete List. Flow is carried over to FIG. 7, which is discussed in further detail below.

If the Insert List sequence value is not equal to the Source List sequence value, as shown at 618, a determination is made in condition block 620 as to whether the Insert List sequence value is less than the Source List sequence value. If the sequence value of the current element of the Insert List is less than the sequence value of the current element in the Source List, as indicated at 622, the current element in the Insert List is the candidate, as indicated at block 624. This case indicates to the C&PF that the current element in the Insert List should come before the current element in the Source List. Therefore, the current element in the Insert List is the element used for the next step. The current Insert List element (CILDSE) is then advanced to the next element in the Insert List, as shown at block 626. Again, flow through the found loop continues to the flowchart of FIG. 7, where the candidate is filtered through the Delete List, as discussed below.

The "false" condition at 628, resulting from the comparison at block 620, indicates that the sequence value of the current element in the Insert List is greater than the sequence value of the current element in the Source List. This case indicates to the C&PF that the current element in the Insert List should come after the current element in the Source List. Therefore, the current element in the Source List is the element used for the next step, as indicated at block 630. The current Source List element (CILDSE) is then advanced to the next element in the Source List, as shown at block 632. As discussed above, flow then proceeds to FIG. 7 to filter the candidate through the Delete List.

Referring to FIG. 7, the resulting Data Stream Element candidate is next filtered through the Delete List, as shown at 702. This step determines whether the element that the C&PF believed to be the current Apparent List element has been deleted.

Loop 710 is entered at 704 while the current Delete List sequence value is less than the Apparent List sequence value and while the end of the Delete List has not yet been reached. While this condition exists, the current value from the Delete List (CDLDSE) is deleted form the DDSEL, as shown at block 706. Flow moves to conditional block 712, once it is determined that the Delete List sequence value is greater than or equal to the Apparent List sequence value. The end of loop 710 is shown at block 708.

Conditional block 712 determines whether the Delete List sequence value is equal to the Apparent List sequence value. A "true" result, as shown at 714, indicates to the C&PF that this element was deleted, so it must not be returned as the current element in the Apparent List. The current Delete List sequence value pointer (CDLDSE) is incremented by one, as shown at block 718. The C&PF must return via loop 720 to the beginning of the found loop 602 to obtain another candidate element as shown at block 722.

If the Delete List sequence value is not equal to the Apparent List sequence value, as indicated by "false" at 716, the Delete List sequence value must be greater than the Apparent List sequence value. This case indicates to the C&PF that the element was not deleted, as shown at block 724. Hence, the found loop is ended, as indicated at block 726.

A method for determining whether the resulting Data Stream Element has been selected is shown at FIG. 8. This method is not considered a "filter" since the candidate element is now known to be the current element in the Apparent List.

A first determination is made at block 802 to check if the end of the Source List and the end of the Insert List have been reached. The "true" result shown at 804 sets the current DSE to indicate the end of the Apparent List, as shown at block 806. If both the Source and Insert Lists are ended, there is no need to determine whether the current DSE and Apparent List has been selected and the process is ended at 806. Alternatively, if the condition of block 802 is "false", as shown at 808, a search is conducted through the Flagged List for the candidate, as shown at 810.

Loop 812 is entered while the Flagged List sequence value is less than the Apparent List sequence value, as shown at blocks 814 and 816. The CFLDSE is incremented within the loop. Once the conditional loop 812 is complete, it must be determined whether the Flagged List sequence value is equal to the Apparent List sequence value. See block 818. Numeral 820 indicates the equality of the sequence values. Therefore, the current DSE has been selected and should be flagged, as shown at block 822. The current DSE is then set in the Apparent List, as shown at 824.

A "false" condition, see 826, at the output of condition block 818 indicates that the Flagged List sequence value is greater than the Apparent List sequence value. This result is shown at 828. The current DSE therefore need not be flagged. The current DSE is then merely set in the Apparent List at 824.

The following example shows the contents of a filter while it is being used to display and manipulate a list of objects on a panel. The sequence value for each of these example elements is simply the name in ascending order.

Figure 9:
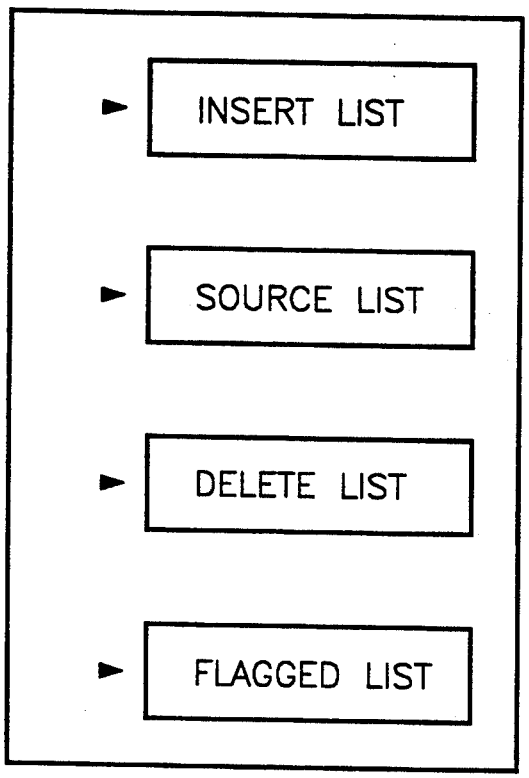
FIG. 9 shows a filter layout for a scenario in connection with the present invention.

The C&PF layout for the scenario is shown in FIG. 9. Arrows represent the current attributes of the respective list. The initial display of the list panel is shown in FIG. 10A. Both the visual panel and the C&PF list two elements. In this example, each element comprises two fields. The first field is the element's name and the second a telephone extension. The first two elements are "Floyd" and "Mary Kathryn", respectively. Mary Kathryn is the current attribute, as indicated by the arrow in the Source List of the C&PF at FIG. 10B.

FIGS. 11A and 11B represent the visual panel and the new state of the filter after an element has been added by the user. The visual panel shows the insertion of the third element, "Ritchie", in its proper sequence. The new state of the filter in FIG. 11B indicates Ritchie as the current attribute of the Insert List.

The visual panel of FIG. 12A and the new state of the filter of FIG. 12B show deletion by the user of the second element of the list. As expected, the new state of the filter reflects the deletion of the second element, Mary Kathryn, as the current attribute.

Next, the user selects the second element in the list. The results of the selection are shown in FIGS. 13A and 13B. The second element, Ritchie, has been flagged with a forward slash in the visual panel. The new state of the filter reflects this selection by entering the second element, Ritchie, into the Selected List as the current attribute.

Finally, the user deletes the first element of the list. The visual panel at FIG. 14A reflects the deletion of Floyd, thereby showing only the third element, Ritchie. The new state of the filter (FIG. 14B) now adds the first element, Floyd, to the Delete List. It is worth noting that the Source Lists in FIGS. 10B through 14B have remained the same through the insertion, deletion and selection processes, since no commits were indicated by the user.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

We claim:

1. A system for permitting a user to dynamically process a list of data elements stored in a non-volatile memory having storage portions, for use with any persistent database, comprising:

a source list storage portion for receiving and storing a stream of data elements from the persistent database, said stream of data elements ordered according to a first sequence value, said first sequence value determining the relative position of each data element of said stream of data elements relative to every other data element of said stream of data elements;

an insert list storage portion for storing a first set of data elements corresponding to data elements sought by the user to be added to said stream of data elements, wherein each of said user-added data elements includes a second sequence value, and wherein said first set of data elements is ordered according to said second sequence values in said insert list storage portion, and wherein said second sequence values determine the relative position of each of said user-added data elements relative to every other user-added data element of said first set of data elements in said insert list storage portion;

merging means for merging said stream of data elements and said first set of data elements to generate a second set of data elements and for storing said second set of data elements in an apparent list storage area, said second set of data elements ordered in said apparent list storage area according to said first and second sequence values, wherein said first and second sequence values determine the relative position of each of said second set of data elements with every other data element of said second set of data elements;

first display means, coupled to said apparent list storage portion, for displaying said second set of data elements to the user and for permitting the user to view and update said second set of data elements without committing said updates to the persistent database or modifying said stream of data elements;

a select list storage portion for storing a third set of data elements corresponding to data elements in said second set of data elements which have been selected by the user, said third set of data elements ordered in said select list storage portion according to said first and second sequence values, wherein said first and second sequence values determine the relative position of each of said third set of data elements with respect to every other data element of said third set of data elements in said select list storage portion;

designation means for comparing said second set of data elements to said third set of data elements and for designating those data elements common to said second set of data elements and said third set of data elements;

second display means for indicating to the user said designated data elements of said second set of data elements; and modification means for modifying the persistent database and said stream of data elements when a commit is initiated by the user, said modification causing the persistent database and said stream of data elements to contain the same data elements as those in said second set of data elements.

2. The system according to claim 1, further comprising:

a delete list storage portion for storing a fourth set of data elements corresponding to data elements sought to be deleted by the user, said fourth set of data elements ordered in said delete list storage portion according to said first and second sequence values, wherein said first and second sequence values determine the relative position of each of said user-deleted data elements with respect to every other user-deleted data element of said fourth set of data elements in said delete list storage portion; and second merging means for merging said second set of data elements and said third set of data elements to remove from said second set of data elements those elements which are in said third set of data elements, and for maintaining the relative order between the data elements remaining in said second set of data elements, said second set of data elements representing said apparent list.

3. A system for dynamic processing of unbounded data streams, the system being adapted to operate on a data processing system including a display panel and a database and a non-volatile storage device, the system receiving the unbounded data streams from the database and providing the database with the processed unbounded data streams, the system comprising:

means for receiving an input stream of data elements from the database and designating said input stream as a source data stream;

an insert list of data elements containing a first set of data elements not contained in said source data stream and arranged in sequence according to a corresponding sequence value associated with each of said data elements in said insert list;

a delete list of data elements containing a second set of data elements presently in said source data stream and arranged in sequence according to a corresponding sequence value associated with each of said data elements in said delete list;

a flagged list of data elements containing a third list of data elements selected for further processing and arranged in sequence according to a corresponding sequence value associated with each of said data elements of said flagged list;

means for initializing a current source data stream pointer, a current insert list pointer, a current delete list pointer, and a current flagged list pointer to refer to a first element in said source data stream, said insert list, said delete list, and said flagged list, respectively;

means for determining a data element to be returned to the display panel in response to a request for a current element in an apparent list of data elements including:

means for filtering said source data stream through said insert list of data elements to obtain a candidate data element for the next element in said apparent list of data elements, means for filtering said candidate data element through said delete list of data elements to verify said candidate element has not been deleted, means for checking said candidate data element through said flagged list of data elements to determine if said candidate element has been flagged, and means for setting said candidate data element as the current data element in said apparent list and returning said current data element to the display panel.

4. A system according to claim 3, wherein said first, second and third sets of data elements are each in ascending order.

5. A method for dynamic processing of unbounded data streams, the system being adapted to operate on a data processing system including a display panel, a database, and a non-volatile storage device, the method comprising the steps of:

receiving an input stream of data elements from the database and designating said input stream as a source data stream;

maintaining an insert list of data elements containing a first set of data elements not contained in said source data stream and arranged in sequence according to a corresponding sequence value associated with each of said data elements in said insert list;

maintaining a delete list of data elements containing a second set of data elements presently in said source data stream and arranged in sequence according to a corresponding sequence value associated with each of said data elements in said delete list;

maintaining a flagged list of data elements selected for further processing and containing a third list of data elements arranged in sequence according to a corresponding sequence value associated with each of said data elements in said flagged list;

initializing a current source data stream pointer, a current insert list pointer, a current delete list pointer, and a current flagged list pointer to refer to a first element in said source data stream, said insert list, said delete list, and said flagged list, respectively;

determining a data element to be returned to the display panel in response to a request for a current element in an apparent list of data elements including:

filtering said source data stream through said insert list of data elements to obtain a candidate data element for the next element in said apparent list, filtering said candidate data element through said delete list of data elements to verify said candidate element has not been deleted, checking said candidate data element against said flagged list of data elements to determine if said candidate element has been flagged, and setting said candidate data element as the current data element in said apparent list and returning said current data element to the display panel.

6. A method according to claim 5, wherein said sequencing of said first, second and third sets of data elements is in ascending order.

7. A computer-implemented method for permitting a user to dynamically process a list of data elements stored in a non-volatile memory having storage portions for use with any persistent database, the method comprising the steps of:

storing a stream of data elements received from the persistent database in a source list storage portion;

assigning a first sequence value to each of said stream of data elements stored in said source list storage portion;

storing a first set of data elements in an insert list storage portion according to a second sequence value, said first set of data elements corresponding to data elements sought by the user to be added to said stream of data elements;

merging said stream of data elements and said first set of data elements to generate a second set of data elements representing an apparent list;

storing said second set of data elements in an apparent list storage portion according to said first and second sequence values, wherein said first and second sequence values determine the relative position of each of said date elements in said second set of data elements with every other data element in said second set of data elements;

storing a third set of data elements in a delete list storage portion according to a third sequence value, said third set of data elements corresponding to data elements sought to be deleted from said stream of data elements by the user, said third sequence values determining the relative position of each of said user-deleted data elements with respect to every other user-deleted data elements in said third set of data elements;

filtering said second set of data elements and said third set of data elements to remove from said second set of data elements those data elements in said third set of data elements, said second set of data elements representing said apparent list;

displaying said second set of data elements to the user thereby permitting the user to view and update said second set of data elements without actually modifying the persistent database and said stream of data elements; and updating the persistent database and said stream of data elements when the user initiates a commit, wherein said updated persistent database and said updated stream of data elements are equivalent to said second set of data elements at time of said initiation of said commit.

8. The method according to claim 7, further comprising the steps of:

storing a select list comprising a fourth set of data elements corresponding to user flagged data elements;

comparing said second set of data elements to said fourth set of data elements and designating those data elements common to said second set of data elements and said fourth set of data elements; and indicating to the user said designated data elements of said second set of data elements.

* * * * *

UNITED STATES PATENT AND TRADEMARK OFFICE
CERTIFICATE OF CORRECTION

PATENT NO. : 5,317,730
DATED : May 31, 1994
INVENTOR(S) : Moore et al.

It is certified that error appears in the above-identified patent and that said Letters Patent is hereby corrected as shown below:

In Column 14, line 42, after "and", add "said".

Signed and Sealed this

Sixth Day of September, 1994

Attest:

BRUCE LEHMAN

Attesting Officer

Commissioner of Patents and Trademarks